May 16, 1933.   W. R. GREEN   1,909,858
ANTIFRICTION HEDGE TRIMMER
Filed June 29, 1931   2 Sheets-Sheet 1
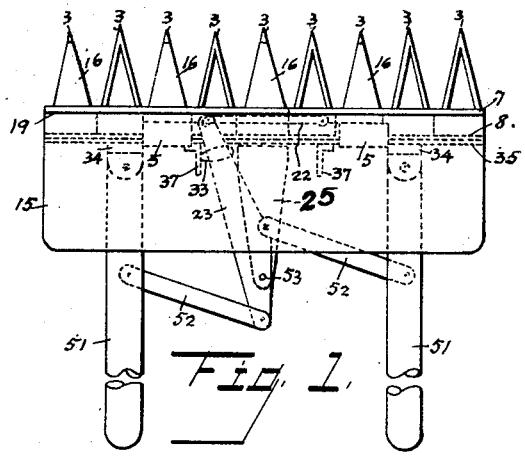
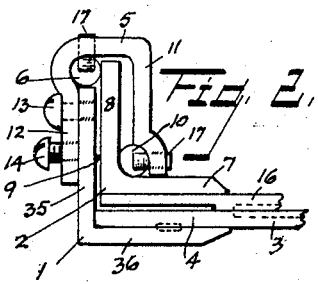
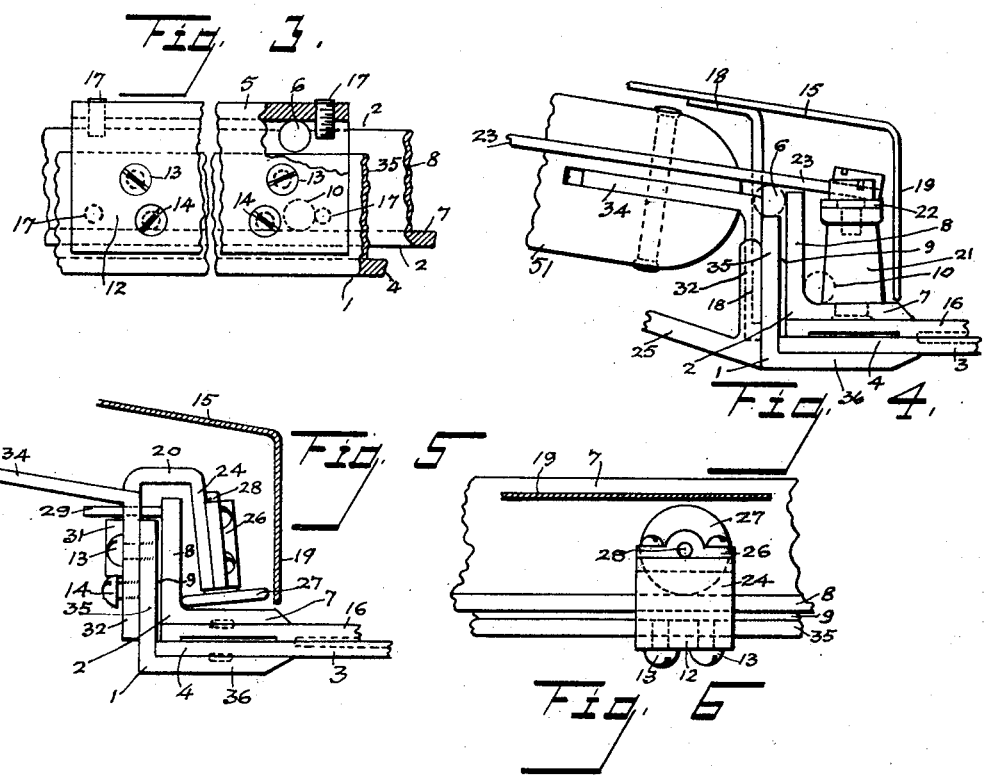
Wyman R. Green   Inventor
By   H. S. Amstutz
Attorney

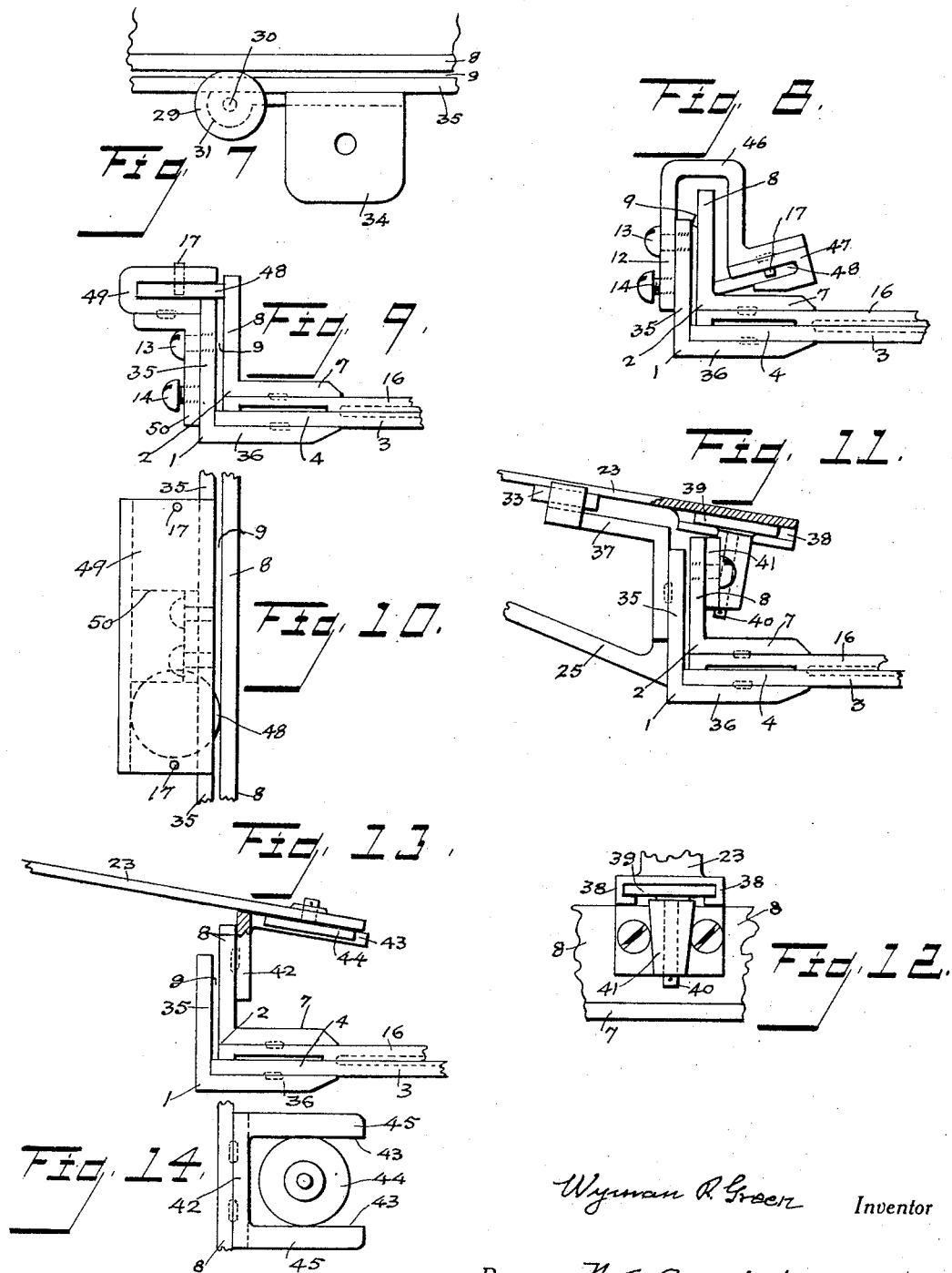

Patented May 16, 1933

1,909,858

UNITED STATES PATENT OFFICE

WYMAN R. GREEN, OF CHATTANOOGA, TENNESSEE

ANTIFRICTION HEDGE TRIMMER

Application filed June 29, 1931. Serial No. 547,669.

My invention relates to improvements in anti-friction hedge trimmers and it more especially consists of the features pointed out in the claims.

The purpose of my invention is to provide a hedge trimmer that is as free from the friction of sliding members as possible; that may use ball runways, stemmed wheels, or flat disk wheels between the stationary and movable bars of the trimmer which support the cutting elements; that also provides a shield to cover the actuating parts against the deposit of a sticky exudate present on the severed twigs; that avoids a jerky action by making the cutter bar very light; and that by reason of these precautions I am able to operate my trimmer with a minimum of effort after prolonged use, and at an increase of efficiency over trimmers proposed heretofore. I am aware that anti-friction devices have come into general use to meet ordinary conditions. In my problem extraordinary conditions exist, circumstances with which previous devices have not coped, hence I secure a new result—one which has not been attained heretofore. Anti-friction devices have not been called on to overcome a sticky exudate, which on drying makes the operation of a hedge trimmer an unsatisfactory and laborious procedure.

The instant invention is a further development of my co-pending applications, Serial No. 484,593, filed September 26, 1930, and Serial No. 528,875, filed April 9, 1930.

With these and other ends in view I illustrate in the accompanying drawings such instances of adaptation as will disclose the broad features of the invention without limiting myself to the specific details shown thereon and described herein.

Figure 1 is a top plan view of an assembled trimmer with a shield covering the working parts.

Fig. 2 is an end elevation of the moving and stationary bars of a trimmer, showing the clearances to overcome sliding friction and means for retaining the balls against loss.

Fig. 3 is a rear elevation of Fig. 2.

Fig. 4 is a diagrammatic side elevation of Fig. 2 showing the balls in dotted lines, the actuating arm, the operating handle, and the shield.

Fig. 5 is a view similar to Fig. 4 showing stemmed wheels.

Fig. 6 is a top plan view of a portion of Fig. 5.

Fig. 7 is a top plan view of a wheel bearing associated with a handle bracket.

Fig. 8 is a view similar to Fig. 2 showing a front disk wheel bearing.

Fig. 9 is a view similar to Fig. 2, showing a rear disk wheel bearing.

Fig. 10 is a top plan view of Fig. 9.

Fig. 11 is a side elevation similar to Fig. 4, showing a modified connection between the actuating arm and the movable bar.

Fig. 12 is a front elevation of Fig. 11.

Fig. 13 is a view similar to Fig. 11, showing a further modification of the same feature.

Fig. 14 is a top plan view of the slotted actuating bracket of Fig. 13, attached to the movable bar.

In commercializing my invention I may use whatever alternatives or equivalents of structure shown or others that the exigencies of varying conditions may demand without departing from the broad spirit of the invention.

In utilizing various anti-friction means I have found it of the utmost importance that every precaution be taken to prevent the sticky exudate, always present in hedge cuttings, from clogging a trimmer by accumulating and drying on the working parts. It is useless to build a trimmer with the greatest mechanical care and expect it to properly function if it is not equipped with anti-friction means and a shield to prevent the cuttings falling onto the operating mechanism.

In the drawings, various anti-friction devices are instanced, ranging from balls 6 and 10 of Fig. 2 to stemmed wheels 27, 29, 39 and 44 of Figs. 5, 6, 7, 11, 12 and 13, and to disk wheels 48 of Figs. 8 and 9.

In the main my improved trimmer comprises a movable bar 2 and a stationary bar 1. Both bars are angular in cross section, the vertical parts are respectively 8 and 35 and the horizontal parts are respectively 7 and 36. Cutting fingers 3 are attached to the part 36 of bar 1 by means of finger extensions 4 and the knives 16 are attached to the part 7 of the bar 2. The fingers 3 and knives 16 may be spot welded or held in any other manner.

When balls are employed I may use a U shaped runway 5 which has a depending portion 12 that is attached to the vertical portion 35 of the stationary bar 1 by means of fastening screws 13. The runways 5 have another depending portion 11. At the junction of 12 and 5 an upper ball 6 is positioned. This ball engages the under side of 5 and the upper edge of the stationary bar 1 and the upper edge of the movable bar 2. At the lower edge of the depending portion 11 a ball 10 is seated at the junction of 7 and 8 of the movable bar 2. The balls may be retained in the runways by pins 17 (Figs. 2 and 3). Similar pins 17 may be used to prevent the loss of flat disks 48 (Figs. 8–10).

Whether balls 5, stemmed wheels 27, or disk wheels 48 are used, they are all held in adjustable relation to the stationary and movable bars 1 and 2 by means of set screws 13 and 14. When these screws 14 are adjusted the screws 13 form a fulcrum and the anti-friction expedients are moved into closed engagement with the respective bars against which they roll thus serving as a combined anti-friction and tension device. A clearance space 9 between the parts 35 and 8 and a recess on the under side of the cutting knives 16 opposite the part 7 and recesses in the cutting elements 3 and 16 all assist in reducing friction. The runways and the actuating links etc., are protected against the accumulation of the sticky exudate of severed twigs by a guard plate 15 and its front flange 19, supported by suitable brackets 18, shown in Fig. 4.

The operating parts of my trimmer comprise handles which move the same distance. These are connected by links to a central operating arm 23 pivoted to a support 25 that is attached to the stationary bar 1. The arm 23 may be connected to the horizontal portion 7 of the movable bar 2 by means of a pedestal 21 and a link 22 (Fig. 4) or the expedients shown in Figs. 11–14 may be substituted.

When substitutes for balls are used the runways 5 are modified as shown in Figs. 5 and 8. In Fig. 5 the vertical portion joins onto the horizontal portion 20, which in turn projects downward at 24. On this projection a bearing 26 is formed for the stem 28 of the wheel 27. In Fig. 8 the vertical portion 12 joins onto the portion 46. A channeled runway 47 in which a wheel 48 rolls is attached to the projection. A further substitute may be used, as shown in Fig. 7, in which a wheel 29 rolls against the part 8 of the bar 2. It has a stem 30 supported in a bearing 31 that is attached to or may form a part of the handle support 34. This handle support has a depending portion 32 by means of which it is attached to the bar 1. The noise of operation is eliminated by means of a rubber buffer 33 secured to the central arm 23. It engages stops 37 positioned on the bar 1 at each extreme of the movement of the arm 23 (Figs. 1 and 11).

The alternative connections between the arm 23 and the movable bar 2, shown in Figs. 11–14 comprise, in Figs. 11 and 12, depending flanges 38 formed on the front end of the arm. Between these flanges a wheel 39 is positioned. It has a stem 40 which is positioned in a bearing 41 attached to the part 8 of the bar 2. In Figs. 13 and 14, a bracket 42 is attached to the bar 2 by spot welding or otherwise. It has a slot 43 formed between a pair of fingers 45 that project forward from the bracket 42. In this slot a stemmed wheel 44 is positioned. The runway 47 cooperates with a rear runway 49 supported on a bracket 50. A disk wheel 48 is positioned in it. Retaining pins 17 serve to prevent the loss of disks 48.

In the exemplifications instanced in Fig. 11 the wheel 39 may be supported on the arm 23 and a channeled bracket attached to the bar 2, or in Fig. 13 the wheel may be supported on a bracket similar to 41 and the equivalent of the slot 43 be formed in the end of the arm 23. As expedients of this kind are obvious mechanical equivalents they are not shown on the drawings.

The trimmer is operated by means of equally movable handles 51 which are connected by links 52 to the central arm 23, on each side of its pivotal point 53. This arm is connected to the movable bar 2 by a link 22 and the bar 2 is in anti-friction relation to the bar 1 by having rolling contacts on opposite faces or edges of the bar whether the bars are angular or flat. By placing the rolling parts in this relation a forward pressure is exerted on the moving bar which brings the cutting edges of the blades firmly together while at the same time the heels are slightly raised thus practically freeing the movable bar from rubbing contact with the stationary bar.

What I claim is:

1. In hedge trimmers, a stationary bar having cutting fingers, a movable bar having cutting knives, anti-friction means cooperating with the movable bar, a pair of equally moving handles pivoted to the stationary bar, a separate link from each of the handles to a central arm pivotally supported on a projection from the stationary bar, means for transmitting movement from the arm to the movable bar, and a guard supported on the trimmer for protecting the operating parts 2. In hedge trimmers, a movable angle bar having a plurality of knives attached to its lower leg, a stationary angle bar having a plurality of cutting fingers secured to its lower leg, means for retaining close engagement on the same plane between the fingers and the knives, anti-friction means between the upper legs of the angle bars, adjacent their upper edges for facilitating the movement of the knives in contact with the fingers, a pair of equally movable handles pivoted to the stationary bar, separate adjacent links connecting the handles to the movable bar, and means adapted to prevent hedge cuttings from contact with the operating parts of the trimmer.

3. In hedge trimmers, a movable angle bar having a plurality of knives attached to its lower leg, a stationary angle bar having a plurality of cutting fingers secured to its lower leg, adjustable anti-friction means co-operating with the vertical legs of both bars adapted to hold the cutting knives and cutting fingers in close operative relation to each other, and means for producing lengthwise displacement between the bars.

4. In a device of the character described, a stationary angle bar, a movable angle bar, means for holding both bars with their upstanding legs in spaced apart relation, cutting elements attached to the horizontal legs of both bars, rolling means on opposite sides of the movable bar, and positioning means supported by the stationary bar for confining the rolling means in operative relation to the bars to hold the cutting elements in engagement with each other while the bars are held out of sliding engagement by the rolling means.

5. In hedge trimmers, a stationary supporting bar having a plurality of recessed cutting fingers projecting therefrom a light weight movable bar having a plurality of recessed cutting blades projecting therefrom, means for holding the bars in spaced apart relation and means from producing displacement of the bars lengthwise thereof whereby due to the spaced apart relation of the bars they are freed from sliding friction and the cutting edges of the fingers and blades are held in close contact as they are moved past each other.

6. In hedge trimmers, a stationary supporting bar having a plurality of recessed cutting fingers, a light weight movable bar having a less number of recessed cutting blades than the cutting fingers, a pair of operating handles pivoted to the supporting member said handles being connected to the movable member for equal movement of each handle and means for positioning the movable member in spaced apart relation to the supporting member so as to free said member from sliding friction and at the same time hold the cutting edges of the fingers and the cutting edges of blades in close contact with each other.

In testimony whereof I affix my signature.
WYMAN R. GREEN.